United States Patent [19]

Gertmar et al.

[11] Patent Number: 5,402,026
[45] Date of Patent: Mar. 28, 1995

[54] ROTOR FOR A SHORT CIRCUITED ALTERNATING CURRENT MOTOR

[75] Inventors: Lars Gertmar; Bengt Rydholm; Chandur Sadarangani; Jens P. Zinck, all of Västerås, Sweden

[73] Assignee: Asea Brown Boveri AB, Västerås, Sweden

[21] Appl. No.: 122,568

[22] PCT Filed: Mar. 20, 1992

[86] PCT No.: PCT/SE92/00171

§ 371 Date: Oct. 1, 1993

§ 102(e) Date: Oct. 1, 1993

[87] PCT Pub. No.: WO92/17933

PCT Pub. Date: Oct. 15, 1992

[30] Foreign Application Priority Data

Apr. 8, 1991 [SE] Sweden .................. 9101026

[51] Int. Cl.⁶ .............. H02K 1/26; H02K 1/28; H02K 17/16
[52] U.S. Cl. .................. 310/182; 310/197; 310/210; 310/216
[58] Field of Search ............ 310/125, 179, 182, 190, 310/197, 201, 210–212, 216, 261, 264, 62, 63

[56] References Cited

U.S. PATENT DOCUMENTS

| | | | |
|---|---|---|---|
| 2,067,605 | 1/1937 | Griffin | 310/211 |
| 2,794,138 | 5/1957 | Dunn, Jr. | 310/211 |
| 3,778,652 | 12/1973 | Endress | 310/211 |
| 4,358,696 | 11/1982 | Liu et al. | 310/156 |
| 4,499,660 | 2/1985 | Lenz | 29/598 |
| 4,559,463 | 12/1985 | Kobayashi | 310/156 |
| 4,641,051 | 2/1987 | Auinger | 310/61 |
| 4,782,260 | 11/1988 | Ghandhi et al. | 310/216 |
| 5,155,404 | 10/1992 | Sadarengani | 310/211 |

FOREIGN PATENT DOCUMENTS

| | | | |
|---|---|---|---|
| 223272 | 2/1962 | Austria | 310/182 |
| 445922 | 6/1927 | Germany . | |
| 533919 | 9/1931 | Germany . | |
| WO90/04281 | 4/1990 | WIPO . | |

OTHER PUBLICATIONS

International Search Report; No. 9101026 8 Apr. 1991.

Primary Examiner—Steven L. Stephan
Assistant Examiner—D. R. Haszko
Attorney, Agent, or Firm—Watson, Cole, Grindel & Watson

[57] ABSTRACT

A rotor for short-circuited alternating current motors, having a pack of circular rotor blades fixedly mounted on a shaft, the plates have, uniformly around the peripheral edges thereof, a number of recesses which, when the plates are packed, form generally axially extending rotor slots, and each rotor slot includes a first recess or cavity whose peripheral edge forms a closed contour and which accommodates a conductor radially inwards of the mantle surface of the rotor, the peripheral edge of said first recess has a concavity which faces towards said peripheral edge, and a second recess which forms a radially extending slot which extends from a point close to the concavity and out towards said peripheral edge, a bridge is formed between the first recess and the second recess, and the second recess has a widened part which is located between the concavity of the first recess and the peripheral edge.

4 Claims, 2 Drawing Sheets

ROTOR FOR A SHORT CIRCUITED ALTERNATING CURRENT MOTOR

BACKGROUND OF THE INVENTION

FIELD OF THE INVENTION

The present invention relates to a rotor for a shortcircuited alternating current motor, and having a pack of circular rotor blades fixedly mounted on a shaft, the plates have, uniformly around the peripheral edges thereof, a number of recesses which, when the plates are packed, form generally axially extending rotor slots, and each rotor slot includes a first recess or cavity whose peripheral edge forms a closed contour and which accommodates a conductor radially inwards of the mantle surface of the rotor, the peripheral edge of said first recess has a concavity which faces towards said peripheral edge, and a second recess which forms a radially extending slot which extends from a point close to the concavity and out towards said peripheral edge, and a bridge is formed between the first recess and the second recess.

A rotor of this kind is known from U.S. Pat. No. 5,155,404. This known construction is intended for variable frequency operation, wherein the said first recesses are filled with conductors, whereas the second recesses form air gaps. The surfaces between the recesses form an iron bridge to which the major part of the circumferential magnetic leakage field passes, and where damping of the harmonic overtones from the current source can be achieved and the losses generated by said overtones therewith decreased, as a result of saturation effects.

It has long been known to provide short-circuited AC-motors with double rotor slots, in the form of so-called double squirrel-cage rotors. This affords an improved torque curve at high starting torques and the starting current is also slightly lower than in the case of normal so-called single squirrel-cage rotors.

SUMMARY OF THE INVENTION

An object of the present invention is to reduce the cost of rotor manufacture. The manufacture of such motors for different purposes, which although being predominantly the same may be intended for normal sinusoidal operation (mains operation) or for variable frequency operation, has hitherto necessitated the use of a large number of rotor plate punches. More specifically, another object of the invention is therefore to enable one and the same punch tool to be used for rotor plates which are to be used for motors intended for frequency changing operation and for rotor plates which are to be used for motors that are intended for normal sinusoidal operation.

The external measurements of such motors are standardized, so that some thirty dimensions may be involved in powers ranging from 1 to 1000 kW. Since many types of rotor and stator may be needed for each such dimension, it is obvious that the number of punch tools required is also large. When it is necessary to provide separate punch tools for motors that are intended for frequency changing operation, which at present represents a small percentage of the total production but which is steadily increasing, it is evident that the number of tools required will increase considerably. A reduction in the number of tools required would therefore afford considerable economic advantages. Furthermore, the number of punched plates needing to be stored can be halved, which again improves the economy.

Another object of the invention is to provide a rotor slot or groove which can be filled completely with electrically conductive material by aluminium casting. In the case of motors intended for use with variable frequency, however, only a part of the rotor slot is filled and the other part of the slot is filled with air, in which case improved cooling can be achieved in accordance with a particular embodiment.

These objects and advantages, together with other advantages, are achieved in accordance with the present invention with a rotor of the aforedescribed kind which has the characteristic features set forth in the characterizing clause of the following claim 1.

When the inventive rotor is provided with an electrical conductor in only one of the recesses of respective slots, the same advantages are obtained as those obtained with the rotor known from the aforesaid Swedish Patent Specification. By forming additional openings in the plates, radially inwards of the slots, and mounting fan blades or like devices flush with or radially outwards of these openings it is also possible to generate a flow of air through the empty parts of respective slots. This affords the advantage of improved cooling at that part of the rotor where the major part of the rotor losses occur. Circulation thus occurs in one direction through the further openings, in another direction through the gap between rotor and stator, and also through the empty slots. The circulating air will be cooled at the stator shields, and particularly at the shield which is located adjacent the fan end of the motor.

Although the windings of the novel type of rotor, with its alternative rotor-winding possibilities, are primarily intended to be provided by casting techniques, the axial conductors may also have the form of bars or rods.

When the inventive rotor is provided with conductors in both recesses of the rotor slots in the plates, there is obtained a motor which has the advantages afforded by double squirrel-cage rotors, in the form of improved starting torque and improved torque curves at motor speeds beneath the rated speed.

BRIEF DESCRIPTION OF THE DRAWINGS

The invention will now be described in more detail with reference to an exemplifying embodiment thereof and also with reference to the accompanying drawings.

DETAILED DESCRIPTION

Figure 2:
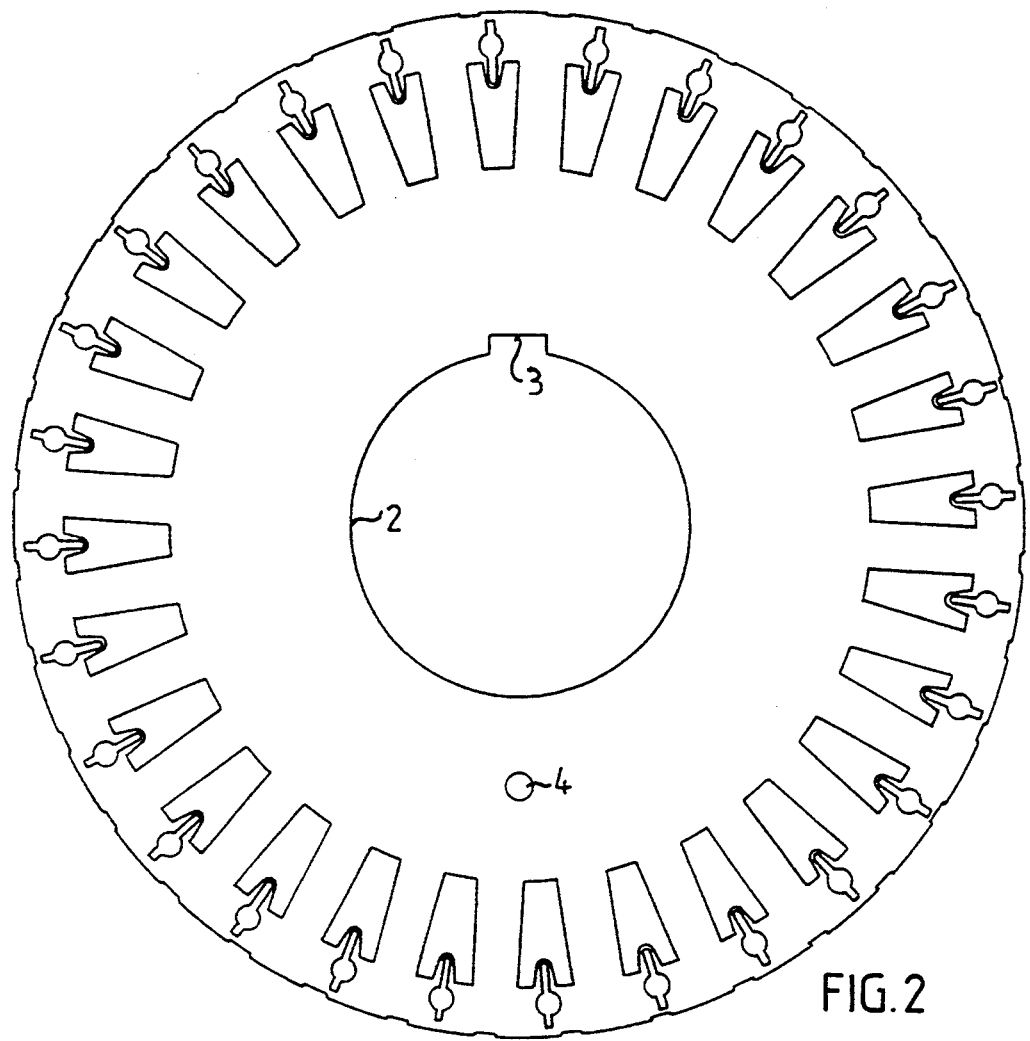
FIG. 2 illustrates a punched rotor plate.
Figure 1A:
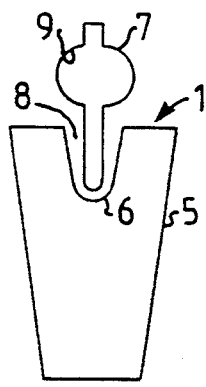
FIGS. 1A–C illustrate the construction of rotor slots in accordance with the invention.

FIG. 1A illustrates the configuration of a rotor slot 1, as it can be punched in electroplate to obtain a rotor plate in accordance with FIG. 2, in which plate 28 such slots have been punched symmetrically in relation to an axle hole 2, this number being shown simply by way of example. In order to facilitate assembly, a notch 3 is formed in the surface of the axle hole 2, this notch being balanced-out by a hole 4.

The rotor slot 1 includes a first recess or cavity 5, which is located nearest the axle or shaft hole 2 (FIG. 2) and the edge of which forms a closed contour with an inwardly turned concavity 6, and a second recess or cavity 7, which penetrates the concavity 6 to form a curved bridge 8 which separates the two recesses. The bridge 8 is preferably dimensioned so that, in the finished motor where only the recesses 5 are provided with conductors and the recesses 7 are empty, the flux density caused by the leakage field of the rotor conductors will be so high as to result in saturation and will preferably lie between 1.5 T and 2.2 T for normally occurring plate qualities.

The configuration of that part of the recess or cavity 7 which penetrates the concavity 6 is thus contingent on the dimensioning of the bridge 8. The recess 7 has a widening 9 at a location further removed from the recess 5, so that the recess 7 will have a sufficient total area and a suitable form in other respects. In the case of the illustrated embodiment, the recess 7 has the approximate shape of the character $\phi$, thus a narrow end of the recess enters the concavity 6 of the recess 5 and an opposite narrow end of said recess 7 terminates closely adjacent to the outer periphery of the rotor plate.

Because of the narrowness of the bridge 8 extending between the first recess 5 and the second recess 7, it is normally necessary to effect punching/clipping in two separate stages, i.e. to form one recess in the one stage and the other recess in the other stage. In the case of very large series, all first and second recesses are preferably punched in their respective stages simultaneously, while in smaller series one recess can be punched at a time. These punching operations will not cause any particular difficulty to one skilled in this art.

Figure 1B:
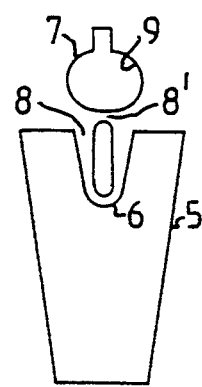
Figure 1C:
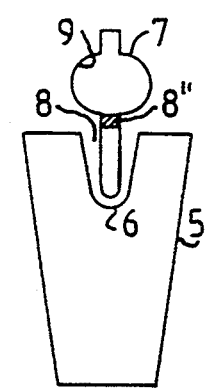

FIGS. 1B and 1C show variants of the rotor slot 1, in which the second recess 7 is divided into two parts by means of relatively narrow bridges over its gap-forming part. This has been achieved in the FIG. 1B embodiment, by bridging the gap-forming part of the second recess 7 with a bridge 8' which forms part of the rotor plate and which is thus of magnetic material. This bridge must be very narrow, in order not to shunt the bridge 8 in an unwarranted manner In the case of the embodiment illustrated in FIG. 1C, bridging is effected instead with the aid of a wedge or bar 8" made of a non-magnetic material and placed in the slot, as indicated in hatch in the Figure.

The punched plates are assembled to form a pack in a conventional manner, and provided with windings, preferably by casting with aluminium or an aluminum alloy, wherein short-circuiting rings can also be arranged in a conventional manner and the pack shrink-fitted onto a rotor axle or shaft.

The significant feature of the present invention is that these windings can be arranged in two different ways, so as to enable two different types of motor to be produced from one and the same form of plates. According to the first of these methods, both the first recesses 5 and the second recesses 7 can be provided with cast conductors, wherein the resultant motor will have roughly the same properties as a corresponding double squirrel-cage rotor. This is made possible by the widened part 9 of the second recess 7, which enables the recess 7 to be readily filled when casting the windings, a possibility which is not found with the earlier mentioned rotor slots known from U.S. Pat. No. 5,155,404, in which the corresponding gaps are much too narrow.

According to the second of the aforesaid methods, only the first recesses 5 are provided with conductors. There is then obtained a rotor which has the advantages afforded by the subject of SE-B-462 310, and thus a motor which is particularly suited for converter operation.

In both instances, the outer periphery of the plate pack is normally machined on a lathe, after having shrink-fitted the pack onto its axle or shaft. In both cases, the pack may be machined on a lathe to such an extent as to open the recesses 7 or to leave narrow iron bridges at the pack periphery. In the second method, with empty recesses 7, it may sometimes be best to open the recesses 7 and therewith provide an improved cooling effect (particularly in the case of low speed ratings), whereas in other cases a smooth rotor surface which will present a lower air resistance may be preferred. The variants of the rotor slot shown in FIGS. 1B and C are utilized in a corresponding manner. The first recess 5 is filled with a conductor while the main part of the second recess 7, which includes the widened part 9 is either filled with a winding or is left empty. In both instances, the bordered part of the second recess 7 is suitably left empty. Although in these variants the second recess may be seen as several recesses, it constitutes only a single recess in the meaning of the invention, although not with a peripheral edge which forms a single closed contour. It nevertheless fulfils the inventive object and functions as the second recess 7 of the embodiment according to FIG. 1A.

Figure 3:
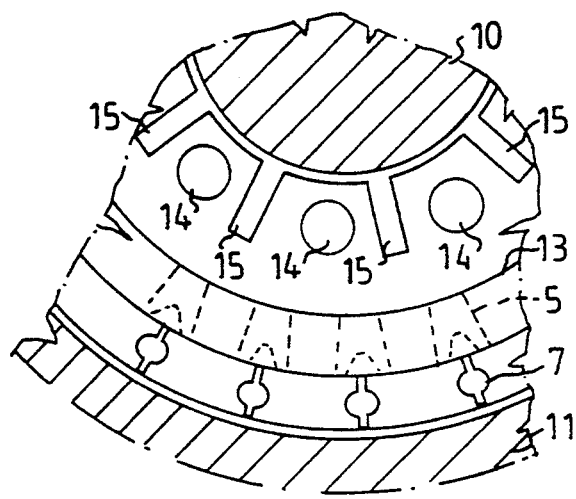
FIG. 3 illustrates schematically part of an end view of a rotor constructed in accordance with a particular embodiment of the invention.
Figure 4:
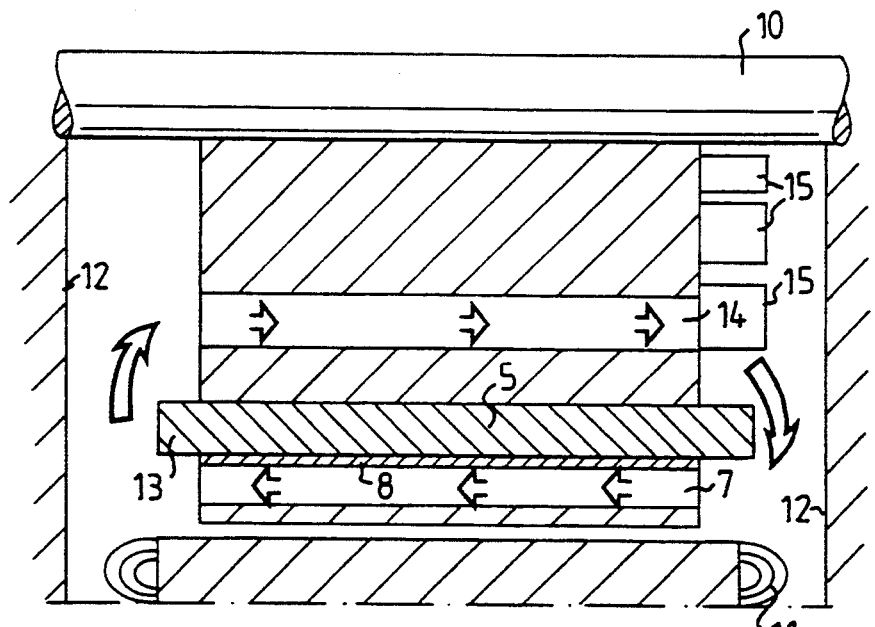
FIG. 4 illustrates schematically the manner in which an air flow is obtained with the embodiment illustrated in FIG. 3.

FIGS. 3 and 4 illustrate schematically a particular embodiment of the invention. These Figures show part of a rotor fitted in a stator 11. The rotor has a shaft 10, on which the plate pack with the first and second recesses 5 and 7 is mounted, inwardly of the stator with coil ends 11 and stator shields 12 (FIG. 4) The ends of the conductors disposed in the recesses 5 are connected to short-circuiting rings 13. The recesses 7 are empty and form axially extending holes which sweep along the aforesaid iron bridges 8.

Further in towards the centre, openings 14, preferably circular openings, have been punched in the rotor plates and placed on a circle which is concentrical with the shaft. Fan blades 15 are mounted at one end externally on the plate pack. When the rotor rotates, the blades 15 drive air in a circulatory path, outwardly from the openings 14 at the same end as the fan blades 15, this air continuing to flow in a circular path via the recesses 7 and to some extent also via the gap between rotor and stator, and is again taken up in the openings 14 at the opposite end of the rotor. An air flow is obtained in accordance with the arrows shown in FIG. 4. This ventilation improves cooling of the rotor, in that heat is transported to the stator shields 12, primarily from those regions at the outermost parts of the rotor windings 5 and the iron bridges 8, where most heat is generated. This results in a more uniform rotor temperature and in a lower mean temperature under generally equal conditions.

What is claimed is:

1. A rotor for short-circuited alternating current motors, comprising a pack of circular rotor blades fixedly mounted on a shaft, the plates have uniformly around the peripheral edges thereof, a number of recesses which, when the plates are packed, form generally axially extending rotor slots, and each rotor slot includes a first recess or cavity whose peripheral edge forms a closed contour and which accommodates a conductor radially inwards of the mantle surface of the rotor, the peripheral edge of said first recess has concavity which faces towards said peripheral edge, and a second recess which forms a radially extending slot which extends from a point close to the concavity and out towards said peripheral edge, a bridge is formed between the first recess and the second recess and the second recess has a widened part which is located between the concavity of the first recess and the peripheral edge.

2. A rotor according to claim 1, wherein those parts of the rotor slots which are formed by the first recess are filled with cast metal, to form conductor bars which are connected at their respective ends with short-circuit rings on both sides of the plate pack, and those parts of the rotor slots that are formed by the second recesses are empty.

3. A rotor according to claim 1, wherein both those parts of the rotor slots formed by the first and second recesses are filled with cast metal, so as to form pairs of conductor bars; and all conductor bars are connected at the ends thereof to short-circuiting rings on both sides of the plate pack.

4. A rotor according to claim 2, wherein the plates include a plurality of additional openings which are disposed uniformly around a circle which is concentric with respective plates, such as to form axially extending channels; and fan blades are mounted at one end of the plate pack, inwardly of those parts of the rotor slots formed by respective second recesses.

* * * * *